(12) United States Patent
Al Shehri

(10) Patent No.: US 11,994,402 B2
(45) Date of Patent: May 28, 2024

(54) SYSTEM AND METHOD FOR AUTOMATED ELECTRONIC GUIDANCE DURING EMERGENCIES

(71) Applicant: Saudi Arabian Oil Company, Dhahran (SA)

(72) Inventor: Salem Mohammed Al Shehri, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 233 days.

(21) Appl. No.: 17/148,634

(22) Filed: Jan. 14, 2021

(65) Prior Publication Data
US 2022/0221289 A1 Jul. 14, 2022

(51) Int. Cl.
| | |
|---|---|
| G01C 21/34 | (2006.01) |
| G01C 21/36 | (2006.01) |
| G01P 13/00 | (2006.01) |
| G01P 13/02 | (2006.01) |
| G06F 3/0481 | (2022.01) |
| G08G 1/0969 | (2006.01) |

(52) U.S. Cl.
CPC ..... *G01C 21/3461* (2013.01); *G01C 21/3407* (2013.01); *G01C 21/3632* (2013.01); *G01C 21/3691* (2013.01); *G08G 1/0969* (2013.01); *G01P 13/0013* (2013.01); *G01P 13/02* (2013.01); *G06F 3/0481* (2013.01)

(58) Field of Classification Search
CPC ............ G01C 21/3461; G01C 21/3407; G01C 21/3632; G01C 21/3691; G08G 1/0969; G01P 13/0013; G01P 13/02; G06F 3/0481
See application file for complete search history.

(56) References Cited

U.S. PATENT DOCUMENTS

| | | | |
|---|---|---|---|
| 2003/0160708 A1 | 8/2003 | Knoop | |
| 2008/0186227 A1 | 8/2008 | Shyur et al. | |
| 2008/0300518 A1 | 12/2008 | Bowes | |
| 2010/0291883 A1* | 11/2010 | Lim | ..................... H04B 1/3833 455/90.2 |

(Continued)

FOREIGN PATENT DOCUMENTS

JP 2001319297 A1 * 5/2000 ............... G08G 1/09

OTHER PUBLICATIONS

Translation_of_JP2001319297A1 (Year: 2000).*

(Continued)

*Primary Examiner* — Kenneth J Malkowski
*Assistant Examiner* — Carville Albert Hollingsworth, IV
(74) *Attorney, Agent, or Firm* — DINSMORE & SHOHL LLP

(57) ABSTRACT

An emergency responder guidance system and method for directing emergency responder vehicles in a restricted area. The system includes a sensor device, an interface device, or both, disposed in the restricted area and operable to provide an indication of an emergency condition in the restricted area. The systems includes a visual indicators disposed at a different locations along pathway of the restricted area. The systems includes a response path generator communicatively coupled with the sensor device, the interface device, or both, and with the plurality of visual indicators. The response path generator determines a target path through the pathway to a location of the emergency condition.

20 Claims, 15 Drawing Sheets

(56) References Cited

U.S. PATENT DOCUMENTS

| | | |
|---|---|---|
| 2016/0125730 A1 | 5/2016 | Sloo et al. |
| 2017/0374192 A1 | 12/2017 | Gersten |
| 2018/0181091 A1* | 6/2018 | Funk ...................... G08G 1/133 |
| 2019/0155285 A1* | 5/2019 | Wang ................... G05D 1/0255 |
| 2019/0164411 A1 | 5/2019 | Allen |
| 2020/0026299 A1* | 1/2020 | Mielenz ............... G05D 1/0214 |

OTHER PUBLICATIONS

Ramasami et al., "Advanced Ambulance Emergency Services Using GPS Navigation", International Journal of Engineering Research & Technology, ISSN: 2278-0181, ETEDM—2018 Conference Proceedings, Special Issue, 2018, 5 pgs.

Saklani, "Geo-Enabled Real Time Emergency Response System using Open System Architecture", Thesis submitted to Andhra University, Aug. 2014, 74 pgs.

* cited by examiner

SYSTEM AND METHOD FOR AUTOMATED ELECTRONIC GUIDANCE DURING EMERGENCIES

TECHNICAL FIELD

The present disclosure relates to systems and methods for directing emergency responder vehicles in a restricted area and, more particularly, to systems and methods included automated electronic guidance systems for directing emergency responder vehicles in a restricted area.

BACKGROUND

Emergency response in restricted areas has attracted increasing attention. Restricted areas can include industrial facilities, residential neighborhoods, or the like. In an emergency, such as a fire, it may be important to direct emergency responders to the location of the emergency in a timely fashion. When an emergency arises in a restricted area, the pathway to the location may provide several different possible routes. In some traditional systems, flagman may be placed along routes to direct emergency responders. This may increase the risk of further emergencies and may result in human error. In other systems, emergency responder vehicles include Global Positioning System ("GPS") devices and specialized communication devices. The driver of the first responder vehicles must interact with the devices to receive navigation instructions.

Thus, there is a need for improved systems for directing emergency responder vehicles in a restricted area. For instance, there is a need for an electronic emergency response guidance system that directs emergency responder vehicles through a restricted area.

BRIEF SUMMARY

According to the subject matter of the present disclosure, described is an emergency responder guidance system for directing emergency responder vehicles in a restricted area. The system comprising a sensor device, an interface device, or both, disposed in the restricted area and operable to provide an indication of an emergency condition in the restricted area, a plurality of visual indicators each disposed at a plurality of different locations along pathway of the restricted area, and a response path generator communicatively coupled with the sensor device, the interface device, or both, and with the plurality of visual indicators. The response path generator is operable to identify at least one location of the emergency condition within the restricted area based on input data received from the sensor device, the interface device, or both, determine a target path through the pathway to the at least one location of the emergency condition, select output visual signals for the plurality of visual indicators, wherein the output visual signals indicate a desired direction of travel along the target path, instruct each of the plurality of visual indicators to display a directional signal that is specified by the output visual signals. In an example, the response path generator is further operable to identify at least one environmental factor at the restricted area, determine the target path through the pathway based on the at least one environmental factor and the probability of effecting or being effected by the emergency condition. The response path generator may be operable to identify the at least one environmental factor as a wind direction, and determine the target path through the pathway such that the target path is not downwind of location of the emergency condition. The system may include a wind direction sensor, wherein the response path generator may be further operable to identify the wind direction from input received from the wind direction sensor. In an example, the response path generator may be further operable to identify the at least one environmental factor as a flammable material stored at a storage location with the restricted area, and determine the target path through the pathway such that the target path maintains a distance from the storage location. In examples, the system may further comprise a programmable logic controller, wherein the programmable logic controller comprises logic that, when executed, comprises the response path generator. The programmable logic controller may be coupled to each of the plurality of visual indicators. The plurality of visual indicators may include a plurality of traffic light devices. The interface device may comprise a plurality of buttons, switches, or both, and the interface device may be coupled to the programmable logic controller. Each of the plurality of buttons, switches, or both may identify an individual location in the restricted area, and ay activate one of the plurality of buttons, switches, or both indicates the at least one location of the emergency condition. The sensor device may comprise a smoke detector device, a flame detector device, a gas detector device, or a combination thereof.

Also described is an emergency responder guidance system for directing emergency responder vehicles in a restricted area, the system including a sensor device, an interface device, or both, disposed in the restricted area and operable to provide an indication of an emergency condition in the restricted area, a plurality of visual indicators each disposed at a plurality of different locations along pathway of the restricted area, and a response path generator communicatively coupled with the sensor device, the interface device, or both, and with the plurality of visual indicators, the response path generator operable to identify at least one location of the emergency condition within the restricted area based on input data received from the sensor device, the interface device, or both, identify at least one environmental factor at the restricted area, determine a target path through the pathway to the at least one location of the emergency condition based on the at least one environmental factor and the probability of effecting or being effected by the emergency condition, select output visual signals for the plurality of visual indicators, wherein the output visual signals indicate a desired direction of travel along the target path, and instruct each of the plurality of visual indicators to display a directional signal that is specified by the output visual signals. The response path generator may be further operable to identify the at least one environmental factor as a wind direction, and determine the target path through the pathway such that the target path is not downwind of location of the emergency condition. The system may comprise a wind direction sensor, wherein the response path generator may be further operable to identify the wind direction from input received from the wind direction sensor. In an example, the response path generator may be further operable to identify the at least one environmental factor as a flammable material stored at a storage location with the restricted area, and determine the target path through the pathway such that the target path maintains a distance from the storage location. The sensor device may comprise a smoke detector device, a flame detector device, a gas detector device, or a combination thereof.

Further describes is a method for directing vehicles in a restricted area, the method comprising identify at least one location of an emergency condition within the restricted area based on input data received from a sensor device, an interface device, or both, identify at least one environmental factor at the restricted area, determining a target path through pathway of the restricted area based on the at least one location of the emergency condition and on the at least one environmental factor and the probability of effecting or being effected by the emergency condition, select output visual signals for the plurality of visual indicators, wherein the output visual signals indicate a desired direction of travel along the target path, and instructing each of the plurality of visual indicators to display a directional signal that is specified by the output visual signals.

Although the concepts of the present disclosure are described herein with primary reference to directing emergency vehicles in restricted areas, it is contemplated that the concepts will enjoy applicability to any directing any vehicles within a restricted area. For example, and not by way of limitation, it is contemplated that the concepts of the present disclosure will enjoy applicability to directing commerce vehicles, traffic in the event of evacuations, or the like.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
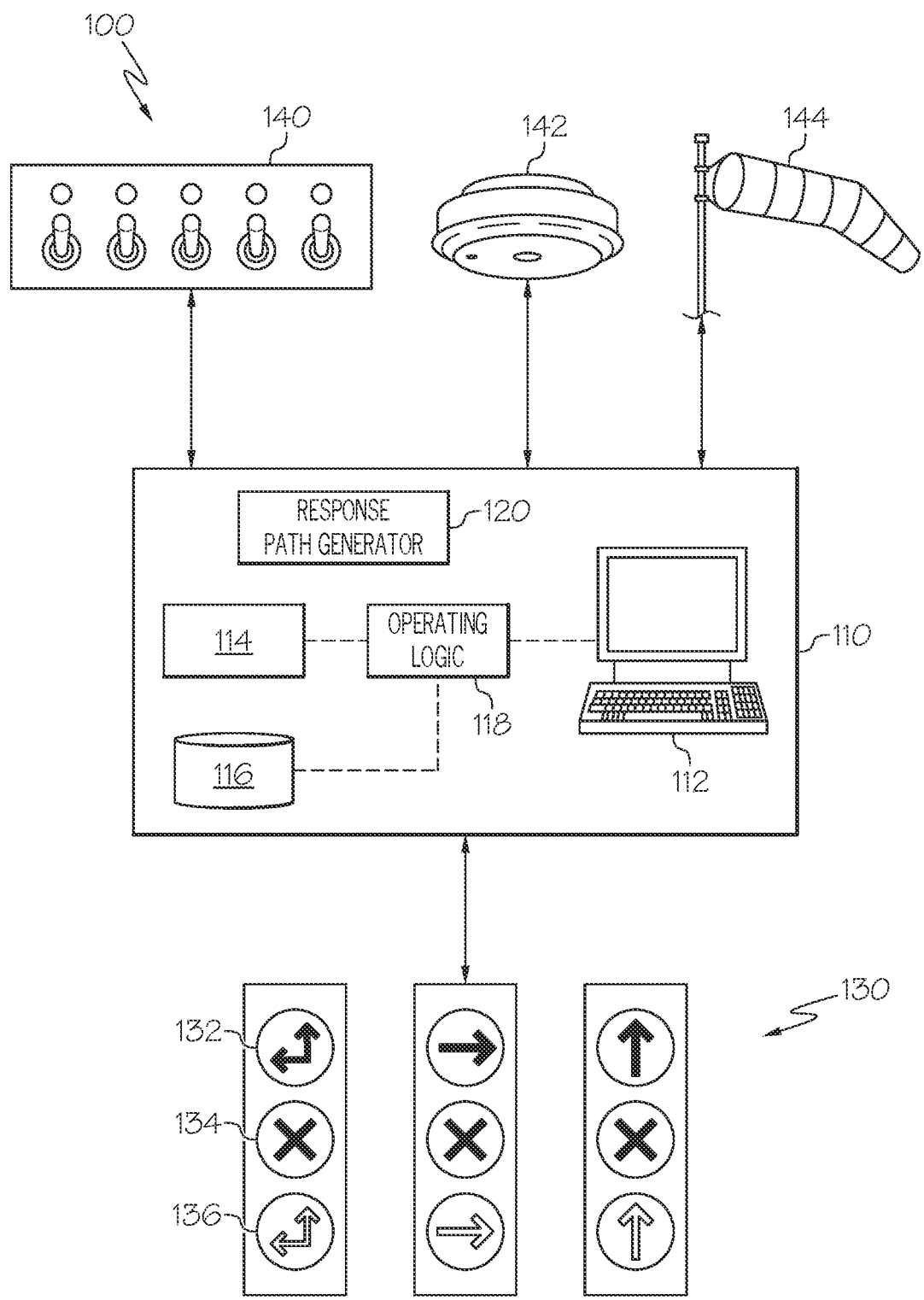
FIG. 1 schematically depicts an emergency responder guidance system for directing emergency responder vehicles in a restricted area according to one or more embodiments shown and described herein.

Referring initially to FIG. 1, there is an emergency responder guidance system 100 for directing emergency responder vehicles in a restricted area. The system 100 may comprise a control station 110, a plurality of visual indicators 130, a sensor devices 142, an interface device 140, and a wind direction sensor 144. The control station 110 may receive input from the plurality of visual indicators 130, the sensor devices 142, the interface device 140, the wind direction sensor 144, or other devices. In another aspect, the control station 110 may generate output to control the plurality of visual indicators 130 based on received input. For example, the control station 110 may identify at least one location of an emergency condition within the restricted area based on input data received from the sensor devices 142, the interface device 140, or both. The control station 110 may determine a target path through the pathway to the at least one location of the emergency condition and may select an output visual signal for at least one of the plurality of visual indicators 130, wherein the output visual signal indicates a desired direction of travel along the target path. The control station 110 may further instruct the at least one of the plurality of visual indicators 130 to generate the output visual signal.

The control station 110 may comprise a computing device, such as a personal computing device, server computing device, mobile computing device, smart phone, tablet computer, wearable device, set top box, or the like. Such computing devices may include various other devices that may comprise hardware and/or software (e.g., program threads, processes, computer processors, non-transitory memory devices, etc.). It is noted that such computing device may perform some or all functions described herein. Additionally, control station 110 may represent a plurality of computing devices communicatively coupled together. The control station 110 may comprise a non-transitory computer-readable medium and may communicate via networks embodied as hardware, software, and/or firmware, according to embodiments shown and described herein. In embodiments, the control station 110 may include hardware, software, and/or firmware. In at least some embodiments, the control station 110 may be configured as a special purpose computer designed specifically for performing the functionality described herein.

The control station 110 may include a controller 114 and a memory component 116. The memory component 116 may include a data store. The memory component 116 may be configured as volatile and/or nonvolatile memory and, as such, may include random access memory (including SRAM, DRAM, and/or other types of random access memory), flash memory, registers, compact discs (CD), digital versatile discs (DVD), and/or other types of storage components. Additionally, the memory component may be configured to store operating logic 118 and a response path generator 120 (each of which may be embodied as a computer program (i.e., computer readable instructions), firmware, or hardware, as an example).

The controller 114 may include programmable logic controller, processing component, or the like that may be configured to receive and execute computer readable instructions (such as from memory component 116). It is noted that the controller 114 may include the memory component 116 as internal memory, external memory, or both. For instance, a programmable logic controller may include memory component 116 that may store operating logic 118 that may comprise the response path generator 120.

As described herein, the control station 110 may communicate to other devices via a network, such as through network hardware that may include any wired or wireless networking hardware, such as a modem, LAN port, wireless fidelity (Wi-Fi) card, WiMax card, mobile communications hardware, and/or other hardware for communicating with other networks. For instance, the controller 114 may include one or more network interface devices that allow the controller 114 to communicate with the plurality of visual indicators 130, the sensor devices 142, the interface device 140, and the wind direction sensor 144, each of which may be communicatively coupled to the controller 114 via network interface devices.

In another aspect, the control station 110 may include input/output hardware 112, which may include a monitor, keyboard, mouse, printer, camera, microphone, speaker, and/or other device for receiving, sending, and/or presenting data. For example, the input/output hardware 112 may include the interface device 140. The interface device 140 may be located at or within the control station 110, at other locations within a restricted area, or the like. It is noted that the interface device may be coupled to the controller 114. The interface device 140 may comprise a plurality of buttons, switches, or both. The interface device 140 may comprise an electronic display (e.g., touch screen), or the like, with a graphical user interface that may be configured to provide digital buttons or tokens in other forms (e.g., drop down lists, radio buttons, etc.).

According to examples, each button or switch of the interface device 140 may represent a location within a restricted area, where the restricted area may be divided into a plurality of zones or locations. The response path generator 120 may store in memory a location assignment for each button or switch of the interface device 140. A user may activate a button or switch of the interface device 140 to indicate that the location associated with the activated button or switch currently has an emergency condition. For instance, a user may press a button, toggle a switch, interact with an electronic display, or the like.

The interface device 140 may be located at a central location, such as a control room. In the event of an emergency, an operator may access the control room and interact with the interface device 140 to identify the location of the emergency condition. It is noted that the interface device 140 may be disposed in other locations, distributed in a plurality of locations, distributed on a plurality of devices, or the like. For example, buttons or switches may be disposed at a plurality of locations throughout a restricted area. This may allow operators to interact with the interface device 140 when at various locations in a restricted area. In other examples, the interface device 140 may be comprised on wireless, handheld, or other devices. As an example, a handheld computing device (e.g., smart phone, remote controller, etc.) may include the interface device 140.

In response to activation of one or more switches or buttons of the interface device 140, the response path generator 120 may determine a location of an emergency condition. For example, the response path generator 120 may monitor the states of each switch or button of the interfaced device 140. Upon activation of a switch or button assigned to a particular location in a restricted area, the response path generator 120 determines that the location is associated with an emergency condition. In at least some examples, the response path generator 120 may include a confirmation interface switch or button which may be activated by a user to confirm that an emergency condition has or is occurring at a particular location. The confirmation interface switch or button may reduce false or inadvertent activation. By way of an example, if a switch or button is activated by a user, the control station 110 may generate an alert that the switch or button has been activated, a user may be required to activate the confirmation interface switch or button to confirm that the emergency condition is present. Further, some embodiments may include a timer failsafe. The timer failsafe may provide a time period in which a user must confirm the emergency condition has or is occurring. If the user fails to confirm whether the emergency condition has or is occurring within the time period, the timer failsafe may default to confirm the emergency condition has or is occurring.

The plurality of visual indicators 130 may comprise lights, such as light emitting diodes ("LEDs"), traffic direction lights, display screens, or the like. It is further noted that the plurality of visual indicators 130 may include other devices such as mechanical traffic devices (e.g., gates, motorized signage, etc.). The plurality of visual indicators 130 may be communicatively coupled to the controller 114 to send, receive, or send and receive information to or from the controller 114. As described herein, the control station 110 may send control signals to control the plurality of visual indicators 130. The plurality of visual indicators 130 may direct emergency responder vehicles from an entry point of the restricted area to a location of an emergency condition within the restricted area.

The visual indicators 130 may each comprise one or more lights or groups of lights, such as light 132, light 134, and light 136. It is noted that each traffic direction light of the visual indicators 130 may comprise other or different lights. Moreover, while embodiments described herein may reference a particular color light as examples, any color light, multi-color LEDs, or other lights may be utilized.

According to at least one embodiment, each traffic direction light of the visual indicators 130 may include light 132 comprising at least one red directional arrow, light 134 comprising at least one red no access signal, and light 136 comprising at least one green directional arrow. Each traffic direction light of the visual indicators 130 may receive control input signals from the controller 114 that may cause one or more of light 132, light 134, and light 136 to illuminate. The response path generator 120 may determine the state for each of light 132, light 134, and light 136 as described herein.

Directional arrows may include straight arrows, perpendicular right turn arrows, perpendicular left turn arrows, sharp right turn arrows, sharp left turn arrows, slight right turn arrows, slight left turn arrows, compound turn arrows, or the like. In some instances, the directional arrows may include shapes, symbols, or tokens other than arrows, such as solid red or green circles, lines, or the like. Embodiments may be adapted for local customs, languages, or the like.

The visual indicators 130 may be disposed along pathway of a restricted area. The pathway may include roads, walkways, bridges, tunnels, parking facilities, or the like. In at least some examples, the visual indicators 130 may be disposed at each intersection of a restricted area, at intervals (e.g., set distances, etc.), at high visibility locations, or other locations. Accordingly, the visual indicators 130 may identify target pathway to a location of an emergency condition for emergency responder vehicles as will be described in more detail below.

The sensor devices 142 may comprise one or more sensors disposed throughout a restricted area. It is noted that the sensor devices 142 may be associated with a particular location of the restricted area. For instance, the sensor devices 142 may be communicatively coupled to the controller 114. The controller 114 may store in memory, such as in memory component 116, location assignments for each of the sensor devices 142. In some examples, the location of the sensor devices 142 may be determined based on the sensor devices 142 being wired to particular inputs, including identifiers, including position identifying devices (e.g., GPS devices, RFID devices, wireless tags, etc.), or the like.

The sensor devices 142 may include devices that detect one or more particular emergency conditions, such as smoke detector devices, a flame detector devices, thermal detector devices, gas detector devices, or a combination thereof. In some examples, the sensor devices 142 may include audio devices, optical devices (e.g., cameras, etc.), or the like. For instance, a camera may capture images or video of a location. The controller 114 or another controller may analyze the captured images or video to identify an emergency condition through image or pattern recognition, artificial intelligence algorithms, or the like. As an example, a camera may be disposed to capture images of a location within a restricted area. The images may be processed to identify flames, smoke, or other objects that may indicate the presence of an emergency condition.

According to at least one example, the sensor devices 142 may identify or measure environmental factors that may have a probability of effecting or being effected by the emergency condition. Such factors may include wind direction (which may be identified by a wind direction sensor 144), presence of potentially hazardous or flammable material, obstructions in pathway, or the like. In an example, the sensor devices 142 may include wireless devices, such as receivers, transceivers, or the like. The wireless devices may interact with wireless tags (e.g., RFID tags, NFC tags, etc.) to identify the location, presence, or absence of a wireless tag. The wireless tags may be attached to or included within objects, packaging, storage, equipment, or materials.

As an example, wireless tags may be attached to storage containers containing flammable material. The wireless devices may identify the presence of the storage containers and may provide the location to the controller 114. As described in more detail herein, the response path generator 120 may utilize the location of the flammable material to determine a target path through the pathway to a location of an emergency condition based on the location of the flammable material.

In another example, wireless tags may be attached to equipment which may block or obstruct a pathway during operation. Should an emergency occur and while the equipment is in the pathway and cannot be moved for safety concerns or other reasons, the wireless device may identify the presence of the equipment and may provide the location to the controller 114. As described in more detail herein, the response path generator 120 may utilize the location of the equipment to determine a target path through the pathway to a location of an emergency condition.

It is noted that environmental factors may be identified by other mechanisms, such as by user input, storing locations in memory, identifying locations during programing of the controller 114, or the like. In some embodiments, environmental factors may be ignored, overridden, or the like. For instance, a user may provide input to the interface device 140 or input/output hardware 112 that causes the response path generator 120 to determine a target path regardless of the environmental factors. This may occur when risks associated with an emergency condition overrides risks imposed by environmental factors.

According to at least some examples, the response path generator 120 may be configured to operate in a manual mode or an automatic mode. For instance, in an automatic mode, the response path generator 120 may determine a target path in response to receiving input from sensor devices 142, which may identify a location and/or type of emergency condition. The response path generator 120 may then instruct the plurality of visual indicators 130 to appropriately display directional arrows according to the target path without requiring any user interaction. In other examples, the response path generator 120 may operate in the manual mode that requires at least some user input, such as a user identifying a location or type of an emergency condition, confirming an emergency condition, or the like.

Moreover, embodiments may provide weights to environmental factors, probability of effecting the emergency condition, and estimated time for response vehicles due to the increase for avoiding the emergency condition. In some examples, response path generator 120 may utilize artificial intelligence, statistical models, or other processes and/or algorithms. In various embodiments, systems and methods may utilize other directed and undirected model classification approaches include, e.g., naïve Bayes, Bayesian networks, decision trees, neural networks, fuzzy logic models, and probabilistic classification models providing different patterns of independence.

As described herein, embodiments may eliminate or reduce human error during emergencies, reduce time for responders to arrive at a location, and generally improve emergency response to emergency conditions. For instance, embodiments may allow for configuration according to response plans prior to an emergency. In the event of an emergency, the response plan may be carried out without deviation. Moreover, embodiments may provide for comprehensive guidance for different scenarios to secure safe routes for the external emergency responders. In at least one aspect, described systems and methods may reduce or eliminate the need for humans to directed traffic at locations, such as with flags or the like. This may reduce the risk to those directing traffic as well as allow those individuals to assist in other tasks during emergencies.

It should be understood that the components illustrated in FIG. 1 are examples and are not intended to limit the scope of this disclosure. More specifically, while the components in FIG. 1 are illustrated as residing within the control station 110, this is a non-limiting example. In some embodiments, one or more of the components may reside external to the control station 110. The control station 110 may include similar hardware, software, and/or firmware. Further aspects of the control station 110 will be described herein.

Figure 2:
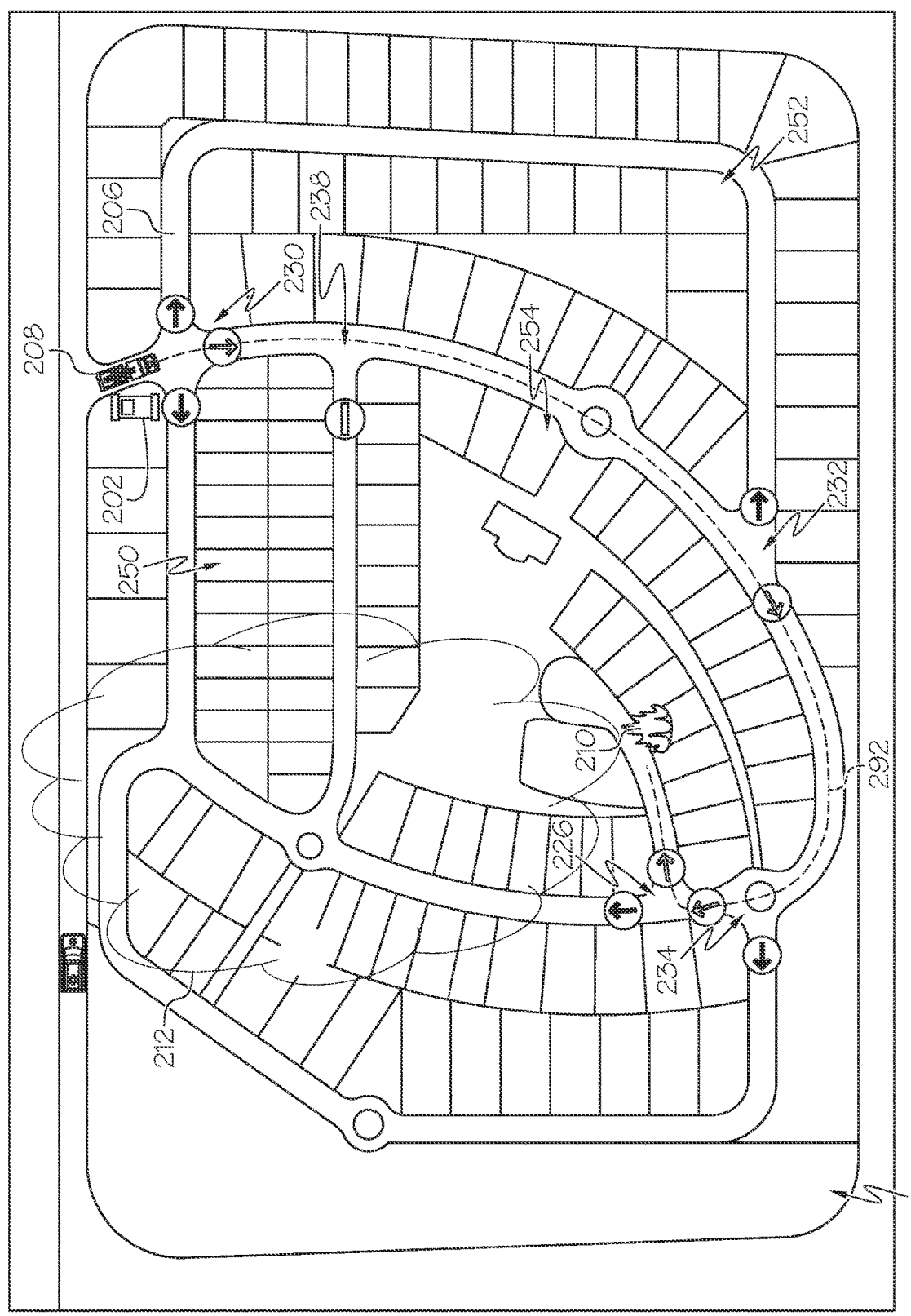
FIG. 2 schematically depicts an emergency responder guidance system for directing emergency responder vehicles in a restricted residential area with an emergency condition and an environmental factor according to one or more embodiments shown and described herein.

Turning now to FIG. 2 with reference to FIG. 1, the emergency responder guidance system 100 for directing emergency responder vehicles is illustrated within a restricted area 200 with an emergency condition 210 and an environmental factor 212. Aspects of the emergency responder guidance system 100 of FIG. 1 may be utilized to direct emergency responder vehicle 208 to the emergency condition 210 within the restricted area 200. Additionally, FIG. 2 illustrates the plurality of visual indicators 130 as including first visual indicator 230, second visual indicator 232, third visual indicator 234, fourth visual indicator 236, and fifth visual indicator 238. While the restricted area 200 is depicted as a restricted residential area, the emergency responder guidance system 100 may be deployed in any other appropriate restricted area, such as in college campuses, industrial plants, airports, populated/restricted areas that may cause delay to rescuers during emergency, industrial facilities, or the like.

The control station 110 of FIG. 1 may be disposed in a gateway 202. The gateway 202 may comprise a controlled entry to a pathway 206. In examples, an operator may monitor the gateway and selectively allow entry into the restricted area. The operator may further interact with aspects of the control station 110, such as input/output hardware 112 and interface device 140.

The restricted area 200 may be organized or otherwise divided into an appropriate number of zones of locations. For examples, the restricted area 200 may be divided into location A 250, location B 252, location C 254, and location D 256. It is noted that the other different zoned locations may be utilized and the locations are provided as examples. In examples, the division and assignment of the locations may be performed by an operator or technician. As described herein, interface device 140 may include a switch or button for each zone. Activation of a switch or button generates an emergency condition signal identifying that a location of an emergency condition 210 within the restricted area 200. In some examples, sensor devices 142 may be utilized to identify the emergency condition 210. In the illustrated example, the emergency condition 210 may comprise a fire. The location of the fire is illustrated in location B 252. The operator may utilize interface device 140 to activate a button or switch assigned to location B 252. In some examples, the interface device 140 may comprise an electronic display providing a graphical user interface, such as a computer monitor providing a map of the restricted area 200. The operator may press the map at the location of the emergency condition 210.

Moreover, in some embodiments, the response path generator 120 may identify a type of an emergency condition 210, such as a medical emergency, a fire, a police/safety emergency, or the like. The response path generator 120 may identify the type based on input provided by the input/output hardware 112, interface device 140, sensor devices 242, or the like. For example, an operator may activate a switch/button, select an emergency type on an electronic display, or the like. In another example, the sensor devices 242 may provide input to the response path generator 120 to indicate the type of emergency, such as a gas leak, fire, or the like.

The response path generator 120 may determine a target path 292 from the gateway 202 to the location of the emergency condition 210 through the pathway 206. The pathway 206 may provide any number of roads, intersections, or the like in which the emergency responder vehicle 208 may travel. By identifying the target path 292, the response path generator 120 may reduce time for the emergency responder vehicle 208 to arrive at the emergency condition 210 as well as reduce potential complications, such as avoiding the smoke (e.g., environmental factor 212) from a fire.

The response path generator 120 may determine the target path 292 through pathway 206 based on received input, such as the location of the emergency condition 210, the environmental factor 212, a type of the emergency condition 210, input from sensor devices 142, or the like. By way of example, the response path generator 120 may identify the target path 292 to avoid being downwind of the emergency condition 210 when the emergency condition 210 is identified as a fire. If the response path generator 120 identifies the emergency condition 210 as a condition that is not effected by wind condition (e.g., medical emergency), the response path generator 120 may determine the quickest path to the emergency condition 210 as the target path. It is noted that embodiments may utilize other criteria to select the target path 292, such as number of turns, dimensions of the pathway 206, dimensions of structures (e.g., bridges, tunnels, etc.), or the like.

In response to identifying the target path 292, the response path generator 120 may select an output visual signal for each of first visual indicator 230, second visual indicator 232, third visual indicator 234, fourth visual indicator 236, and fifth visual indicator 238. In examples, the response path generator 120 may identify the target path 292 as a plurality of output signals or control signals that define states of the plurality of visual indicators 130. For example, the response path generator 120 may determine directional arrows to be illuminated in a color, directional arrows that are not to be illuminated, or other symbols to be illuminated.

In the illustrated example, the response path generator 120 determines to direct the emergency responder vehicle 208 in the target path 292 that is the fastest or most direct path that is not downwind of the emergency condition 210.

The response path generator 120 instructs the first visual indicator 230 to illuminate a south pointing (relative to the drawing of FIG. 2) directional arrow to illuminate in a green color, and illuminate other directional arrows in the red color (e.g., east and west directional arrows). It is noted that the response path generator 120 may instruct directional arrows to be not illuminated rather than illuminated in red. It is further noted that operators may be provide input to customize settings.

Further to this example, the response path generator 120 may instruct the second visual indicator 232 to illuminate a south western pointing directional arrow in green, and an eastern pointing directional arrow in red. The response path generator 120 instructs the third visual indicator 234 to illuminate a north western pointing directional arrow in green and a western pointing arrow in red, and further instructs the fourth visual indicator 236 to illuminate an eastern pointing directional arrow in green and a northern pointing directional arrow in red. It is further noted that the response path generator 120 instructs the fifth visual indicator 238 to illuminate a "do not enter" symbol in red. Moreover, embodiments may include more, other, or different visual indicators disposed throughout the pathway 206.

Figure 3:
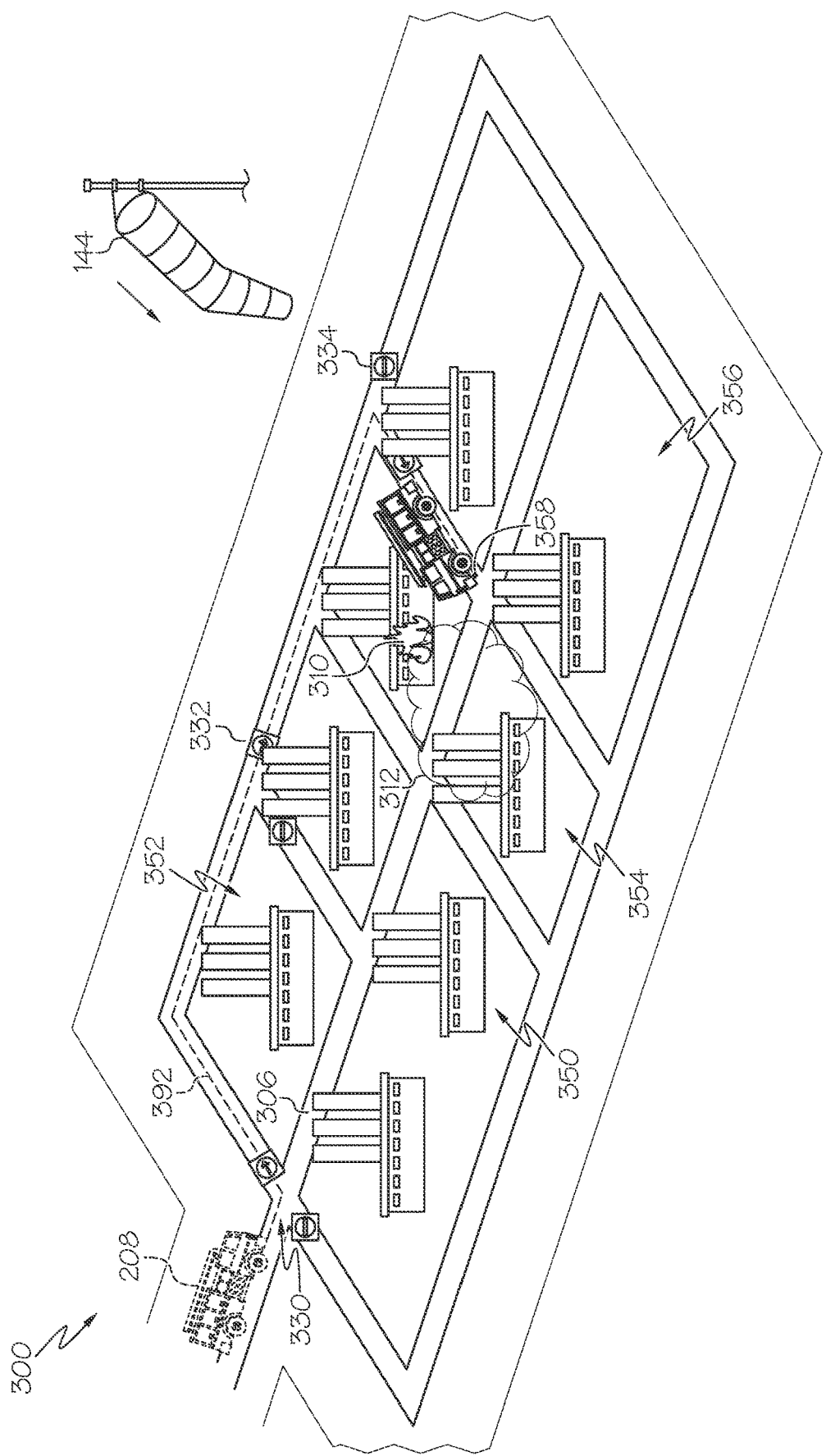
FIG. 3 schematically depicts an emergency responder guidance system for directing emergency responder vehicles in a restricted industrial area with an emergency condition and an environmental wind factor blowing from north to south according to one or more embodiments shown and described herein.

Turning now to FIG. 3 with reference to FIG. 1, the emergency responder guidance system 100 for directing emergency responder vehicles is illustrated within a restricted industrial area 300 with an emergency condition 310 and an environmental factor 312. Aspects of the emergency responder guidance system 100 of FIG. 1 may be utilized to direct emergency responder vehicle 208 to the emergency condition 310 within the restricted industrial area 300. Additionally, FIG. 3 illustrates the plurality of visual indicators 130 as including first visual indicator 330, second visual indicator 332, and third visual indicator 334. It is noted that the plurality of visual indicators 130 may include other visual indicators, such as visual indicators located at each intersection of a pathway 306. Moreover, the restricted industrial area 300 is depicted as comprising zonal locations Location A 350, Location B 352, Location C 354, and Location D 356, Location E 358. Additional or other zonal locations may be identified.

As illustrated, an environmental factor 312 of a wind direction may be measured by a wind direction sensor 144. The wind direction sensor 144 may provide input to the response path generator 120. The response path generator 120 may identify a location of an emergency condition 310 based on input from a user (e.g., via interface device 140), automatically from the sensor devices 142, or the like. The response path generator 120 may determine a target path 392 to direct the emergency responder vehicle 208 to the emergency condition 310 based at least in the environmental factor 312 of wind blowing from north to south. This may allow emergency responders responding to a fire to avoid driving through smoke. For instance, the response path generator 120 may identify the location of the emergency condition as Location E 358 and a wind direction as north to south. Based on the wind direction and the location, the response path generator 120 may determine the target path 392 to avoid areas of potential smoke and may direct the emergency responder vehicle 208 to approach the emergency condition 310 from a northern path that is upwind of the emergency condition.

In the illustrated example, the first visual indicator 330, second visual indicator 332, and third visual indicator 334 each comprise entry lights (green circle) and no-entry lights (red no entry symbol). The response path generator 120 instructs each of the first visual indicator 330, second visual indicator 332, and third visual indicator 334 to illuminate appropriate entry lights and no-entry lights, such that the emergency responder vehicle 208 may be directed to the emergency condition 310 and may avoid the environmental factor 312.

Figure 4:
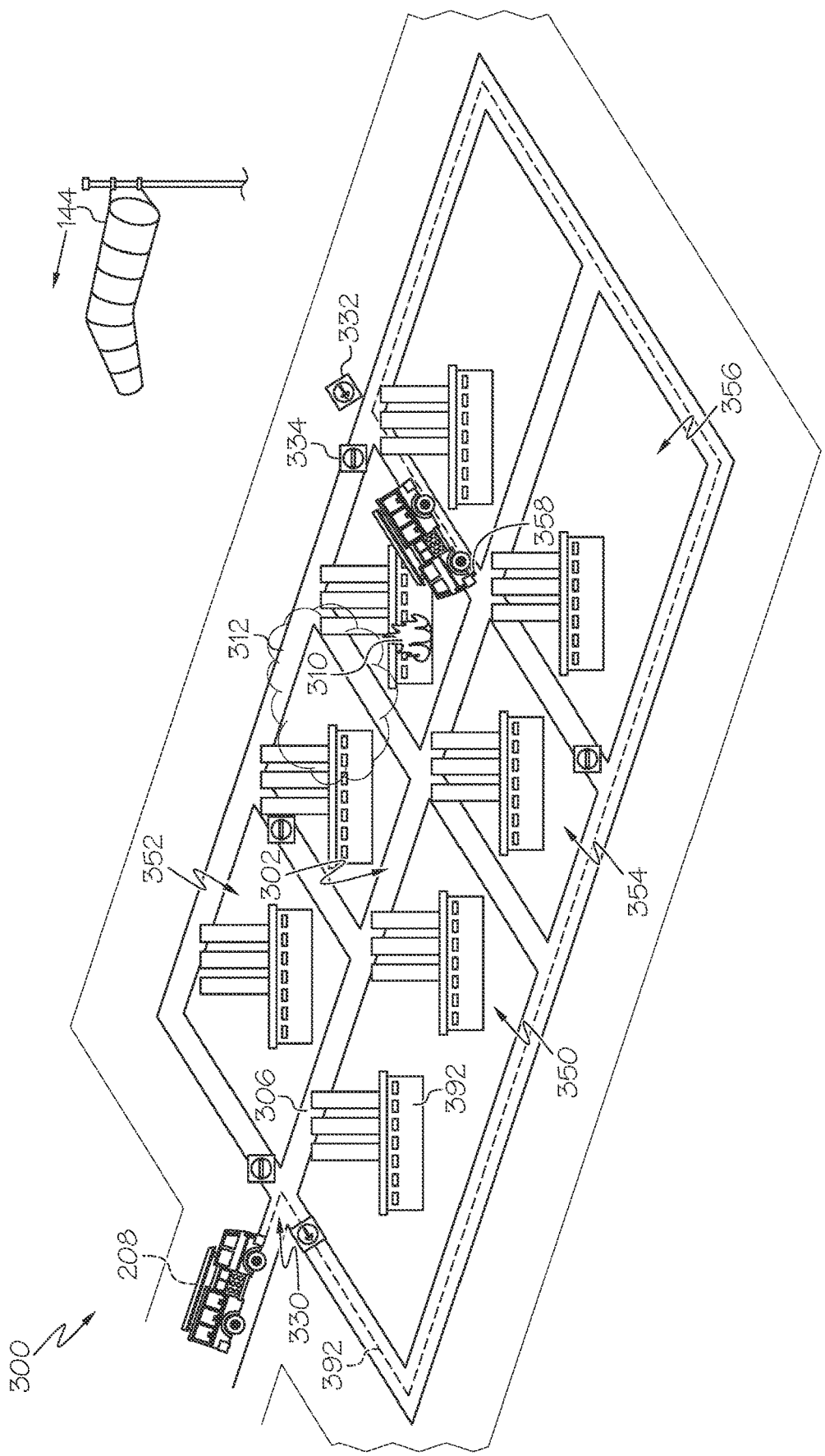
FIG. 4 schematically depicts an emergency responder guidance system for directing emergency responder vehicles in a restricted industrial area with an emergency condition and an environmental wind factor blowing from south to north according to one or more embodiments shown and described herein.

FIG. 4 illustrates the emergency responder guidance system 100 for directing emergency responder vehicles is illustrated within the restricted industrial area 300 with the emergency condition 310 and the environmental factor 312 of a wind direction blowing south to north. Additionally or alternatively, the restricted industrial area 300 includes an additional environmental factor of an obstacle 302 disposed in part of the pathway 306. The restricted industrial area 300 may determine the target path 392 to the emergency condition to avoid the obstacle 302 and avoid being downwind of the emergency condition 310.

Figure 5:
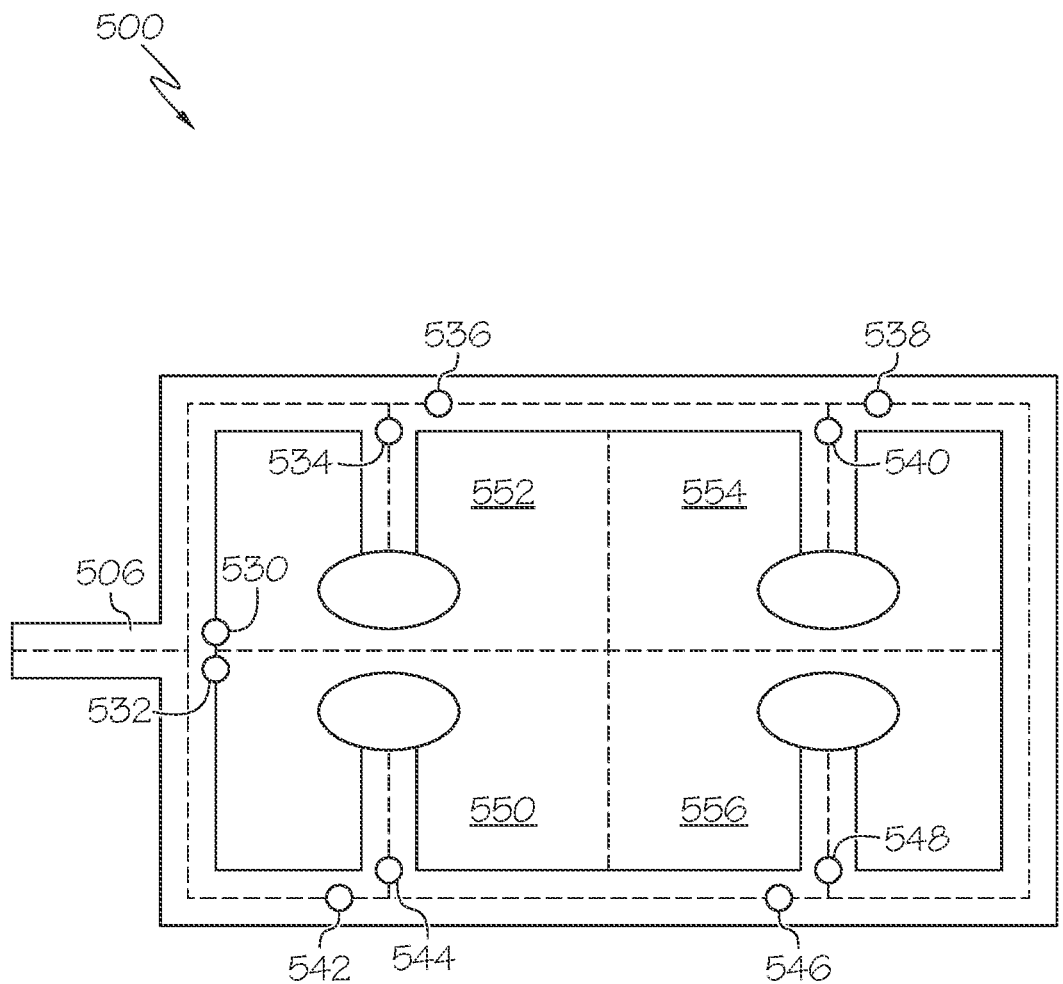
FIG. 5 depicts an emergency responder guidance system for directing emergency responder vehicles in a restricted industrial area comprising four zonal locations with an emergency condition according to one or more embodiments shown and described herein.

FIG. 5 depicts the emergency responder guidance system 100 for directing emergency responder vehicles in a restricted area 500 comprising four zonal locations. In an aspect, the restricted area 500 may be divided into accessible zonal locations, such as Location A 550, Location B 552, Location C 554, and Location D 556. The locations may be labeled with any token (e.g., symbol, color, alpha-numerical characters, etc.) as appropriate. The restricted area 500 may include a pathway 506 that may allow an emergency responder vehicle (e.g., emergency responder vehicle 208 of FIG. 2) to navigate to each of the locations. A plurality of visual indicators 130 may be disposed at intersections, entry points, or other positions along the pathway 506. For instance, the plurality of visual indicators 130 may include visual indicators 530, 532, 534, 536, 538, 540, 542, 544, 546, and 548. As described herein, the response path generator 120 may control the plurality of visual indicators 130 as leading indicators to the location of an emergency condition.

In at least one embodiments the response path generator 120 may utilize a Karnaugh map (e.g., K-map) configuration as a model for determining target response paths. In a K-map configuration, possible inputs and outputs may determine the state of each of the plurality of visual indicators 130, such that a particular combination of inputs may result in a predictable state for each of the plurality of visual indicators 130, which may enable identification of a target path based on the states each of the plurality of visual indicators 130. It is noted that other models, tables, or the like may be utilized by the response path generator 120.

Figure 6:
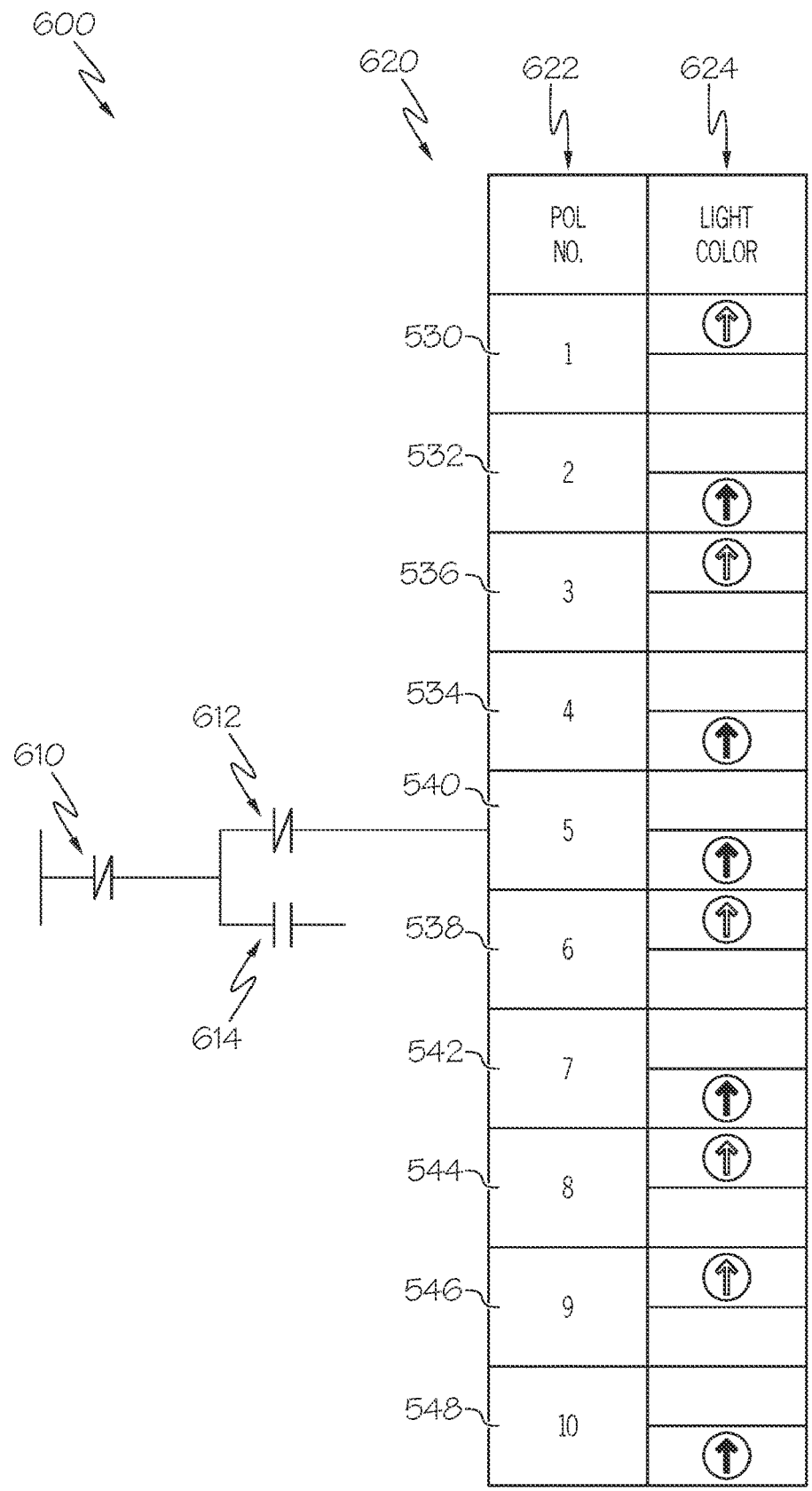
FIG. 6 schematically depicts an example input and output assignment table for the emergency responder guidance system of FIG. 5 according to one or more embodiments shown and described herein.

Referencing to FIG. 6, while referring to FIG. 5, FIG. 6 schematically depicts an example input and output assignment table 620 for the emergency responder guidance system 100 including the visual indicators 530, 532, 534, 536, 538, 540, 542, 544, 546, and 548 according to one or more embodiments shown and described herein. The assignment table 620 may include light state 624 for the visual indicators 530, 532, 534, 536, 538, 540, 542, 544, 546, and 548. The light state may include a color for illumination, a directional arrow, a symbol, or the like. In the illustrated example, each of visual indicators 530, 532, 534, 536, 538, 540, 542, 544, 546, and 548 includes a not illuminated state (e.g., both red and green off), a green illuminated state, and a red illuminated state. The response path generator 120 may receive an input defining a location of an emergency condition at 610, such as via a button or switch activation. At 612 the response path generator 120 may receive input identifying a north to south wind, and at 614, the response path generator 120 may receive input identifying a south to north wind. Based on the inputs, the response path generator 120 may identify a target path defined by green directional arrows.

It is noted that other inputs may be provided such as other wind directions (e.g., east to west, or combinations of cardinal directions), input to disregard wind direction, sensor device input, or the like. Moreover, the response path generator 120 may determine any number of appropriate states to assign to visual indicators 530, 532, 534, 536, 538, 540, 542, 544, 546, and 548.

Figure 7:
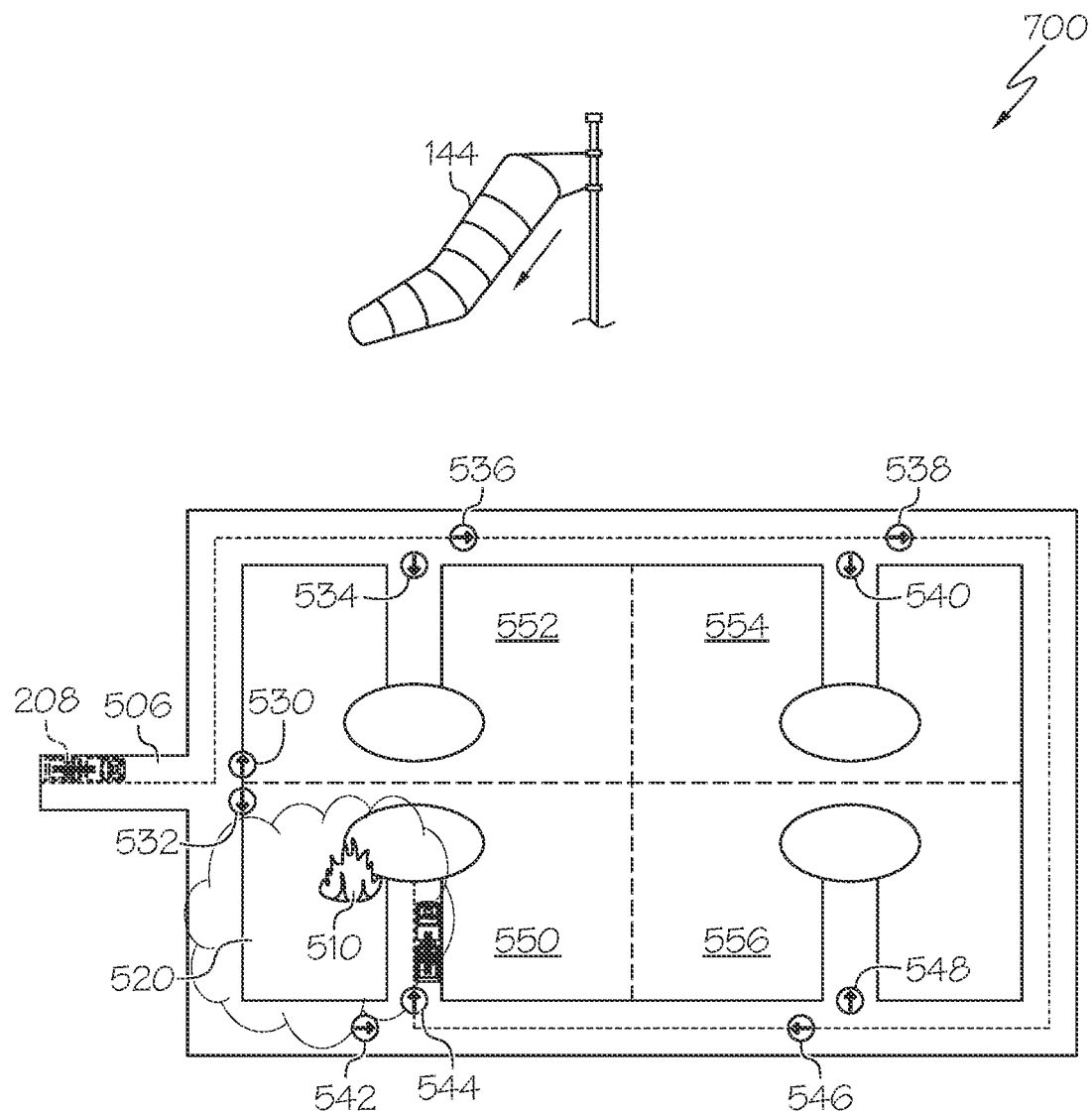
FIG. 7 depicts the emergency responder guidance system of FIG. 5 for directing emergency responder vehicles in a restricted industrial area comprising four zonal locations with an emergency condition in Location A and an environmental factor of wind blowing from north to south according to one or more embodiments shown and described herein.
Figure 8:
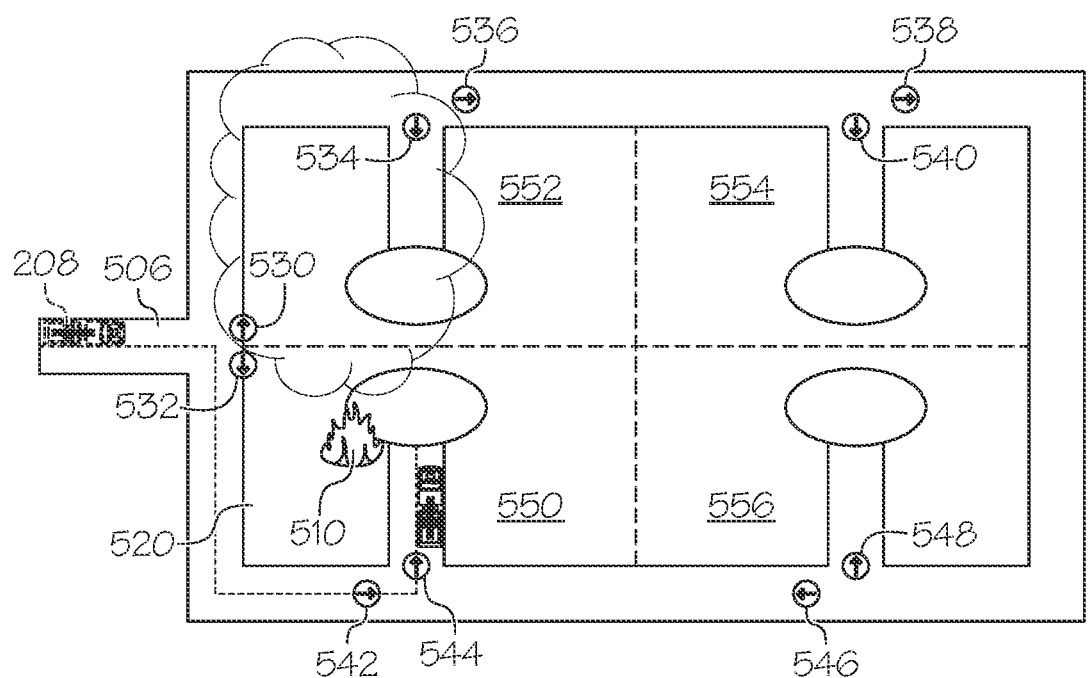
FIG. 8 depicts the emergency responder guidance system of FIG. 5 for directing emergency responder vehicles in a restricted industrial area comprising four zonal locations with an emergency condition in Location A and an environmental factor of wind blowing from south to north according to one or more embodiments shown and described herein.

FIGS. 7-14 depict various examples of differing locations of emergency conditions and differing environmental factors. In FIG. 7, the emergency condition 310 in Location A 550 and an environmental factor 312 of wind blowing from north to south. It is noted that the output assignment table 620 of FIG. 6 illustrates the states of the visual indicators 530, 532, 534, 536, 538, 540, 542, 544, 546, and 548 in FIG. 7. FIG. 8 depicts the emergency condition 310 in location A 550 and an environmental factor 312 of wind blowing from south to north. As can be seen, the response path generator 120 may select the target path 592 to avoid potential smoke from the wind direction.

Figure 9:
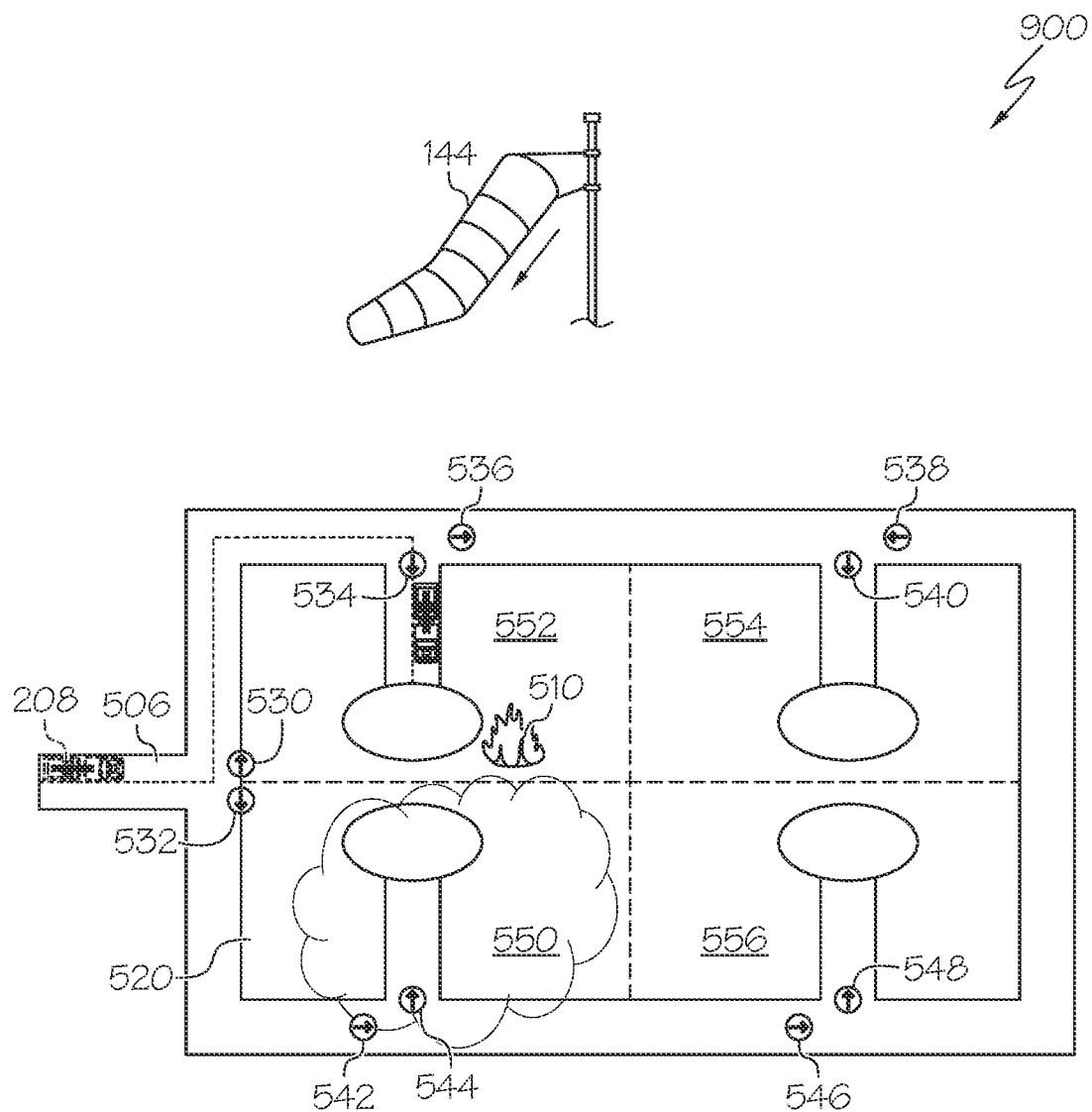
FIG. 9 depicts the emergency responder guidance system of FIG. 5 for directing emergency responder vehicles in a restricted industrial area comprising four zonal locations with an emergency condition in Location B and an environmental factor of wind blowing from north to south according to one or more embodiments shown and described herein.
Figure 10:
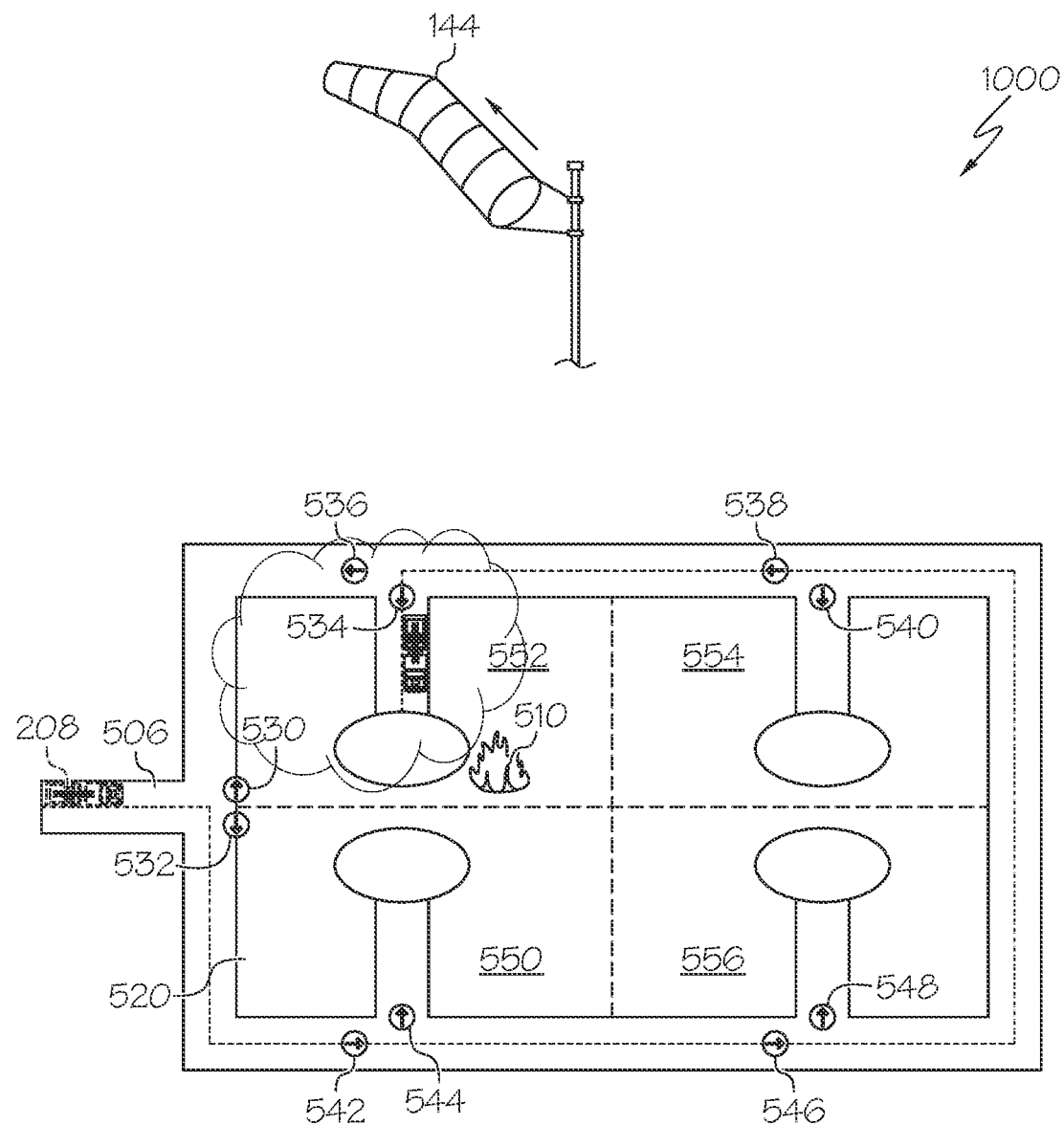
FIG. 10 depicts the emergency responder guidance system of FIG. 5 for directing emergency responder vehicles in a restricted industrial area comprising four zonal locations with an emergency condition in Location B and an environmental factor of wind blowing from south to north according to one or more embodiments shown and described herein.

In FIG. 9, the emergency condition 310 in Location B 550 and an environmental factor 312 of wind blowing from north to south. FIG. 10 depicts the emergency condition 310 in Location B 550 and an environmental factor 312 of wind blowing from south to north. As can be seen, the response path generator 120 may select the target path 592 to avoid potential smoke from the wind direction.

Figure 11:
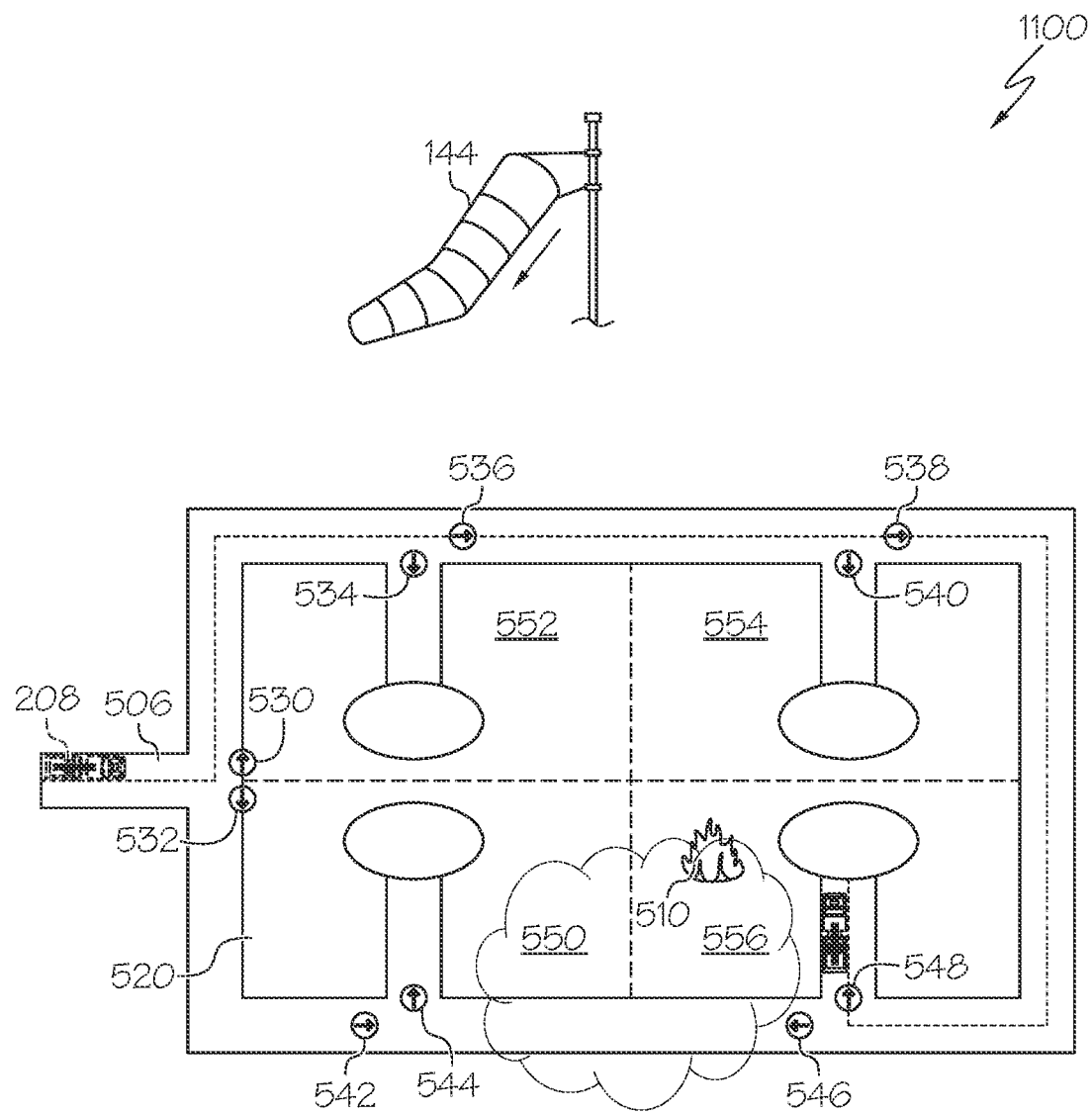
FIG. 11 depicts the emergency responder guidance system of FIG. 5 for directing emergency responder vehicles in a restricted industrial area comprising four zonal locations with an emergency condition in Location C and an environmental factor of wind blowing from north to south according to one or more embodiments shown and described herein.
Figure 12:
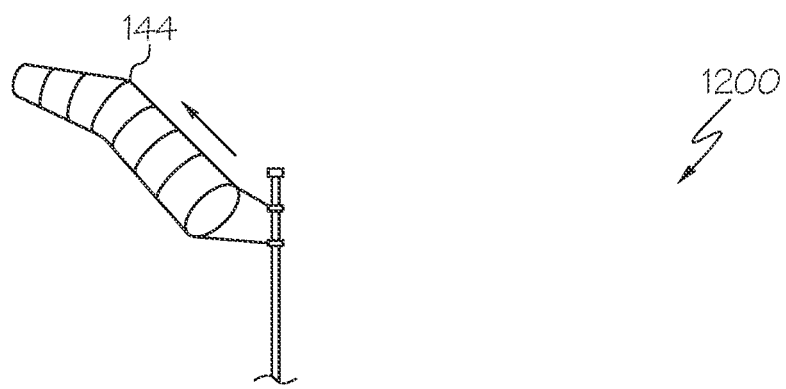
FIG. 12 depicts the emergency responder guidance system of FIG. 5 for directing emergency responder vehicles in a restricted industrial area comprising four zonal locations with an emergency condition in Location C and an environmental factor of wind blowing from south to north according to one or more embodiments shown and described herein.
Figure 12:
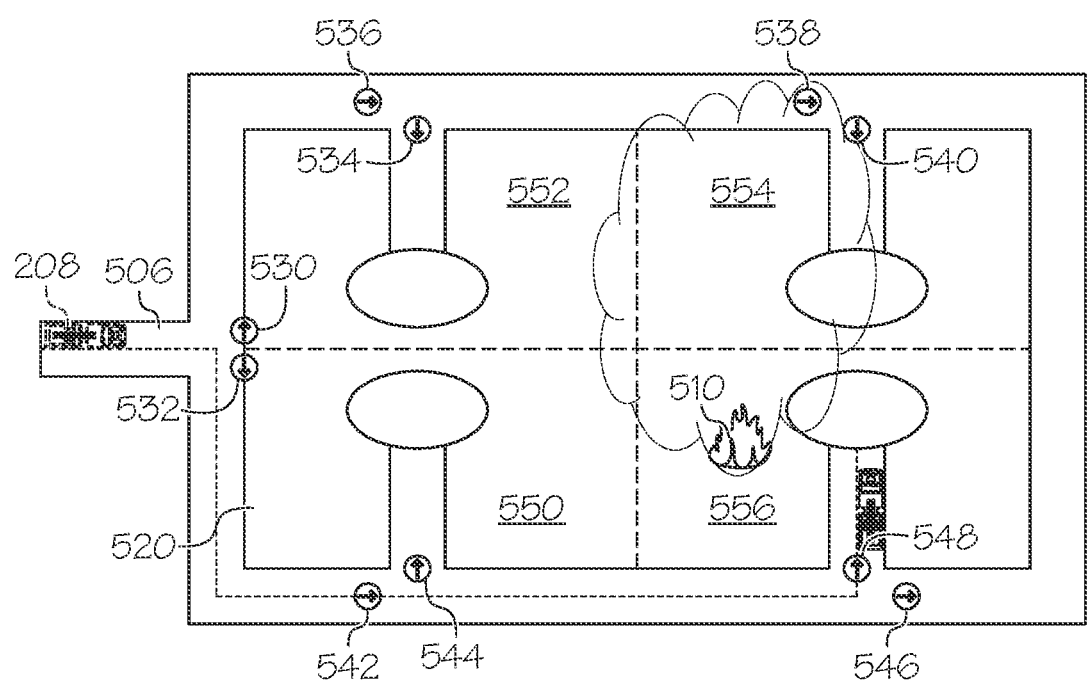

In FIG. 11, the emergency condition 310 in Location C 550 and an environmental factor 312 of wind blowing from north to south. FIG. 12 depicts the emergency condition 310 in Location C 550 and an environmental factor 312 of wind blowing from south to north. As can be seen, the response path generator 120 may select the target path 592 to avoid potential smoke from the wind direction.

Figure 13:
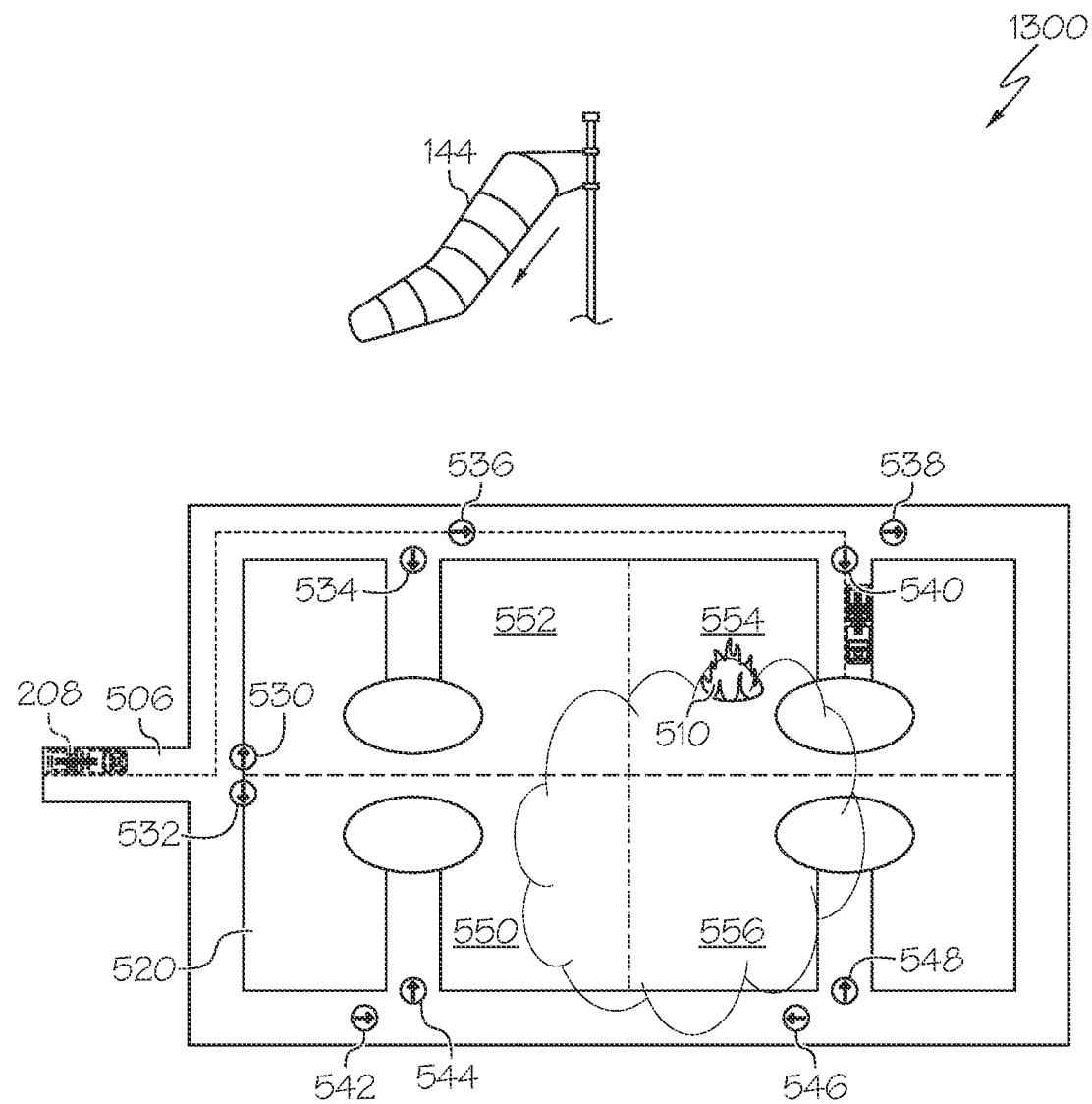
FIG. 13 depicts the emergency responder guidance system of FIG. 5 for directing emergency responder vehicles in a restricted industrial area comprising four zonal locations with an emergency condition in Location D and an environmental factor of wind blowing from north to south according to one or more embodiments shown and described herein.
Figure 14:
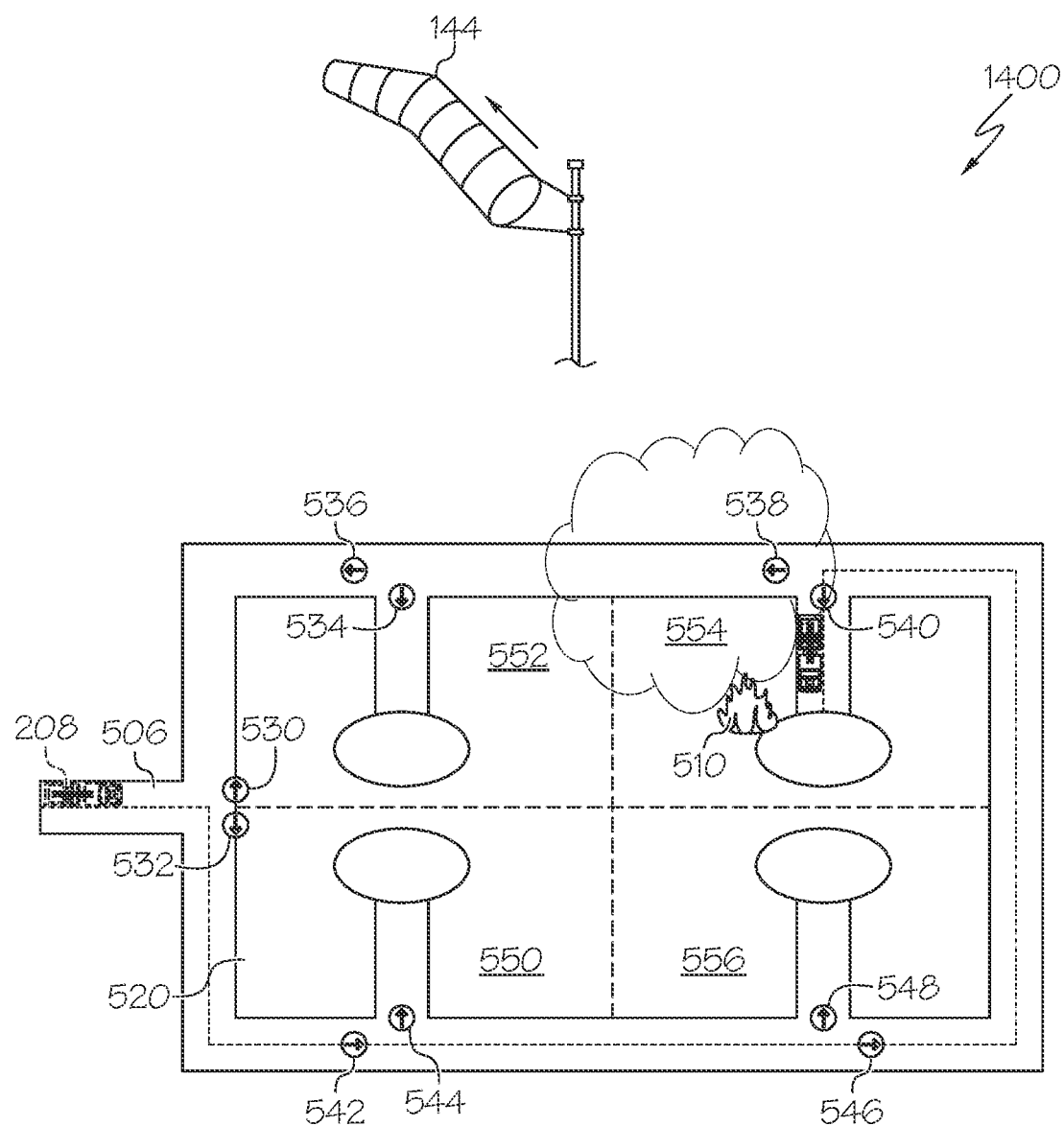
FIG. 14 depicts the emergency responder guidance system of FIG. 5 for directing emergency responder vehicles in a restricted industrial area comprising four zonal locations with an emergency condition in Location D and an environmental factor of wind blowing from south to north according to one or more embodiments shown and described herein.

In FIG. 13, the emergency condition 310 in Location D 550 and an environmental factor 312 of wind blowing from north to south. FIG. 14 depicts the emergency condition 310 in Location D 550 and an environmental factor 312 of wind blowing from south to north. As can be seen, the response path generator 120 may select the target path 592 to avoid potential smoke from the wind direction.

Figure 15:
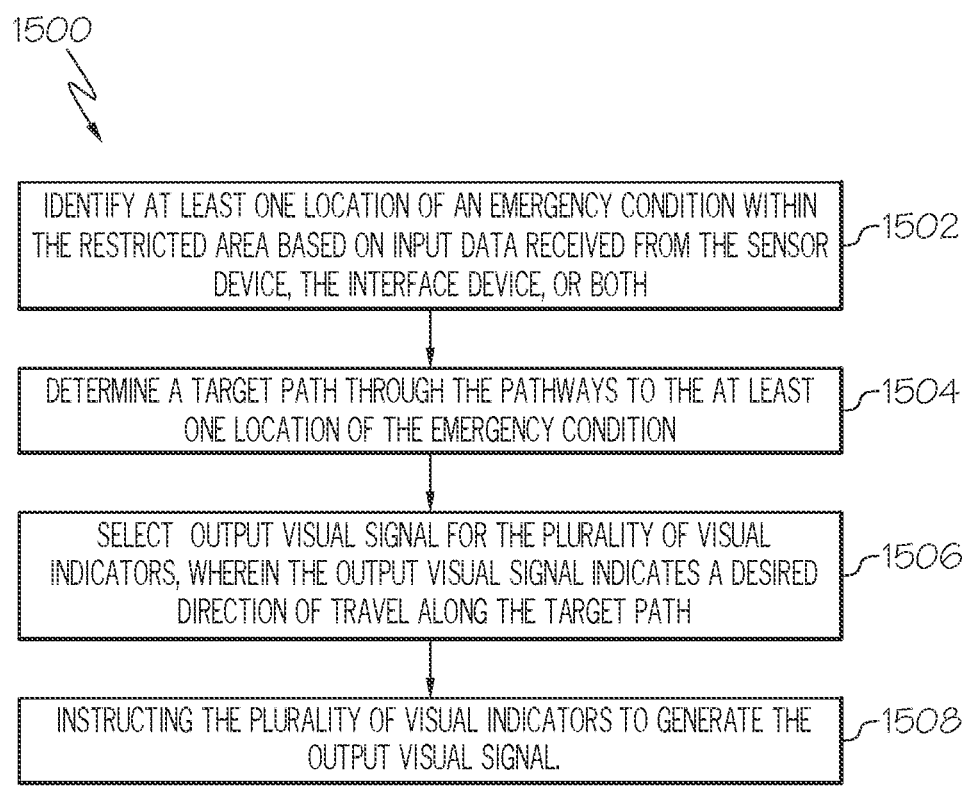
FIG. 15 depicts a flowchart of an example algorithm for directing emergency responder vehicles in a restricted area according to one or more embodiments shown and described herein.

In view of the subject matter described herein, methods that may be related to various embodiments may be better appreciated with reference to the flowchart of FIG. 15. The flow chart of FIG. 15 depicts a method 1500 for directing emergency responder vehicles in a restricted industrial area. While the methods are shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 15 depicts a flowchart of non-limiting method 1500 associated with directing emergency responder vehicles in a restricted industrial area, according to various aspects of the subject disclosure. As an example, method 1500 may direct emergency responder vehicles in a restricted industrial area to respond to an emergency location at a zonal location.

At 1502, a system, such as system 100 or 500, may identify at least one location of an emergency condition within a restricted area based on input date received from a sensor device, an interface device, or both. Identifying the at least one location of the emergency condition may include receiving input from an interface device, a sensor device, or both. In examples, a controller may identify received input and determine a location based on an assignment stored in memory, an identifier received from the input, location information received from the input, or the like.

At 1504, a system may, determine a target path through the pathway to the at least one location of the emergency condition. Determining the target path through the pathway may include determining the target path based on the location of an emergency condition. In some examples, the system may determine a target path based on environmental factors, user preferences (e.g., quickest time, fewest turns, avoidance of particular locations, etc.), input provided from a user (e.g., user override, etc.), a combination thereof, or the like.

At 1506, a system may select an output visual signal for at least one of the plurality of visual indicators, wherein the output visual signal indicates a desired direction of travel along the target path. Selecting the output visual signal may include identifying the output visual signal from an output table or the like.

At 1508, a system may instruct the at least one of the plurality of visual indicators to generate the output visual signal. In examples, the system may include a network and/or network interfaces that may allow a controller to communicate with the plurality of visual indicators. The controller may transmit the instruction to the plurality of visual indicators over the network. It is noted that the plurality of visual indicators may receive the instruction and illuminate one or more appropriate lights.

For the purposes of describing and defining the present invention, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. An emergency responder guidance system for directing emergency responder vehicles in a restricted area, the system comprising:
   a sensor device, an interface device, or both, disposed in the restricted area and operable to provide an indication of an emergency condition in the restricted area;
   a plurality of visual indicators each disposed at a respective intersection of a plurality of intersections along a pathway of the restricted area wherein:
      each intersection comprises a plurality of pathways, and
      each visual indicator is associated with at least one pathway of the respective intersection of the visual indicator; and
   a computing device communicatively coupled with the sensor device, the interface device, or both, wherein the computing device includes a processor and a memory component, the memory component storing computer readable instructions comprising a response path generator, and, with the plurality of visual indicators, the response path generator, when executed by the processor, operable to:
      identify at least one location of the emergency condition within the restricted area based on input data received from the sensor device, the interface device, or both;
      identify at least one environmental factor at the restricted area, the at least one environmental factor comprising a flammable material stored within a storage container within the restricted area;
      determine a target path from an entry point of the restricted area through the pathway to the at least one location of the emergency condition and through one or more target path intersections of the plurality of intersections based on the at least one environmental factor and a probability of affecting or being affected by the emergency condition, wherein the target path maintains at least a minimum distance from the storage container and the minimum distance is determined to avoid potential smoke;
      select output visual signals for a plurality of target path visual indicators of the plurality of visual indicators, wherein each target path visual indicator is disposed at one of the target path intersections; and
      instruct each of the plurality of target path visual indicators to display, at least until the emergency vehicle has arrived at the emergency location:
         for a desired pathway of the respective intersection of each target path visual indicator, a directional signal that is specified by the output visual signals, or
         for each pathway besides the desired pathway of the respective intersection of each target path visual indicator, an indication, specified by the output visual signals, that the pathway of the target path visual indicator is not along the target path, wherein the indication is a no-entry light or a not-illuminated state.

2. The system of claim 1, wherein the response path generator is further operable to:
   identify the at least one environmental factor as a wind direction; and
   determine the target path through the pathway such that the target path is not downwind of the at least one location of the emergency condition.

3. The system of claim 2, further comprising a wind direction sensor, and wherein the response path generator is further operable to identify the wind direction from input received from the wind direction sensor.

4. The system of claim 1, further comprising a programmable logic controller, wherein the programmable logic controller comprises logic that, when executed, comprises the response path generator.

5. The system of claim 4, wherein the programmable logic controller is coupled to each of the plurality of visual indicators.

6. The system of claim 5, wherein the plurality of visual indicators comprise a plurality of traffic light devices.

7. The system of claim 4, wherein:
   the interface device comprises a plurality of buttons, switches, or both; and
   the interface device is coupled to the programmable logic controller.

8. The system of claim 7, wherein:
   each of the plurality of buttons, switches, or both identifies an individual location in the restricted area; and
   activation of one of the plurality of buttons, switches, or both indicates the at least one location of the emergency condition.

9. The system of claim 1, wherein the sensor device comprises a smoke detector device, a flame detector device, a gas detector device, or a combination thereof.

10. An emergency responder guidance system for directing emergency responder vehicles in a restricted area, the system comprising:
    a sensor device, an interface device, or both, disposed in the restricted area and operable to provide an indication of an emergency condition in the restricted area, the sensor device or the interface device comprising a wireless tag;
    a plurality of visual indicators each disposed at a respective intersection of a plurality of intersections along a pathway of the restricted area wherein:
       each intersection comprises a plurality of pathways, and each visual indicator is associated with at least one pathway of the respective intersection of the visual indicator; and
a computing device communicatively coupled with the sensor device, the interface device, or both, wherein the computing device includes a processor and a memory component, the memory component storing computer readable instructions comprising a response path generator, and, with the plurality of visual indicators, the response path generator, when executed by the processor, being operable to:
identify at least one location of the emergency condition within the restricted area based on input data received from the sensor device, the interface device, or both;
identify at least one environmental factor at the restricted area, wherein:
the at least one environmental factor comprises a flammable material stored within a storage container within the restricted area,
the flammable material is identified by the wireless tag,
the wireless tag identifies a location of the flammable material, and
at a time of the identifying of the at least one environmental factor comprising the flammable material stored within the storage container, the flammable material is not inflamed;
determine a target path from an entry point of the restricted area through the pathway to the at least one location of the emergency condition and through one or more target path intersections of the plurality of intersections based on the at least one environmental factor and the probability of affecting or being affected by the emergency condition, wherein the target path maintains at least a minimum distance from the storage container and the minimum distance is determined to avoid potential smoke;
select output visual signals for a plurality of target path visual indicators of the plurality of visual indicators, wherein each target path visual indicator is disposed at one of the target path intersections; and
instruct each of the plurality of target path visual indicators to display, at least until the emergency vehicle has arrived at the emergency location:
for a desired pathway of the respective intersection of each target path visual indicator, a directional signal that is specified by the output visual signals, or
for each pathway besides the desired pathway of the respective intersection of each target path visual indicator, an indication, specified by the output visual signals, that the pathway of the target path visual indicator is not along the target path, wherein the indication is a no-entry light or a not-illuminated state.

11. The system of claim 10, wherein the response path generator is further operable to:
identify the at least one environmental factor as a wind direction; and
determine the target path through the pathway such that the target path is not downwind of the at least one location of the emergency condition.

12. The system of claim 11, further comprising a wind direction sensor, and wherein the response path generator is further operable to identify the wind direction from input received from the wind direction sensor.

13. The system of claim 10, wherein the sensor device comprises a smoke detector device, a flame detector device, a gas detector device, or a combination thereof.

14. A method for directing vehicles in a restricted area, the method comprising:
identify at least one location of an emergency condition within the restricted area based on input data received from a sensor device, an interface device, or both;
identify at least one environmental factor at the restricted area, the at least one environmental factor comprising a flammable material stored within a storage container within the restricted area;
determining a target path from an entry point of the restricted area through a pathway of the restricted area and through one or more target path intersections of the plurality of intersections based on the at least one location of the emergency condition and on the at least one environmental factor and the probability of affecting or being affected by the emergency condition, wherein the target path maintains at least a minimum distance from the storage container and the minimum distance is determined to avoid potential smoke;
select output visual signals for a plurality of target path visual indicators of a plurality of visual indicators, wherein:
the plurality of visual indicators are each disposed at a respective intersection of a plurality of intersections along the pathway,
each intersection comprises a plurality of different pathways,
each visual indicator is associated with at least one pathway of the respective intersection of the visual indicator, and
each target path visual indicator is disposed at one of the target path intersections; and
instructing each of the plurality of target path visual indicators to display, at least until the emergency vehicle has arrived at the emergency location:
for a desired pathway of the respective intersection of each target path visual indicator, a directional signal that is specified by the output visual signals, or
for each pathway besides the desired pathway of the respective intersection of each target path visual indicator, an indication, specified by the output visual signals, that the pathway of the target path visual indicator is not along the target path, wherein the indication is a no-entry light or a not-illuminated state.

15. The emergency responder guidance system of claim 1, wherein a wireless tag identifies the flammable material.

16. The emergency responder guidance system of claim 15, wherein the wireless tag identifies a location of the flammable material.

17. The emergency responder guidance system of claim 1, wherein, at a time of the identifying of the at least one environmental factor comprising the flammable material stored within the storage container, the flammable material is not inflamed.

18. The method of claim 14, wherein a wireless tag identifies the flammable material.

19. The method of claim 14, further comprising identifying a location of the flammable material.

20. The method of claim 14, wherein, at a time of the identifying of the at least one environmental factor comprising the flammable material stored within the storage container, the flammable material is not inflamed.

\* \* \* \* \*